April 26, 1960     R. R. DOUGAN     2,934,290
MEANS FOR CIRCUMVENTING LARGE DEAD ZONES IN
CONTROL SURFACE EFFECTIVENESS
Filed July 5, 1956
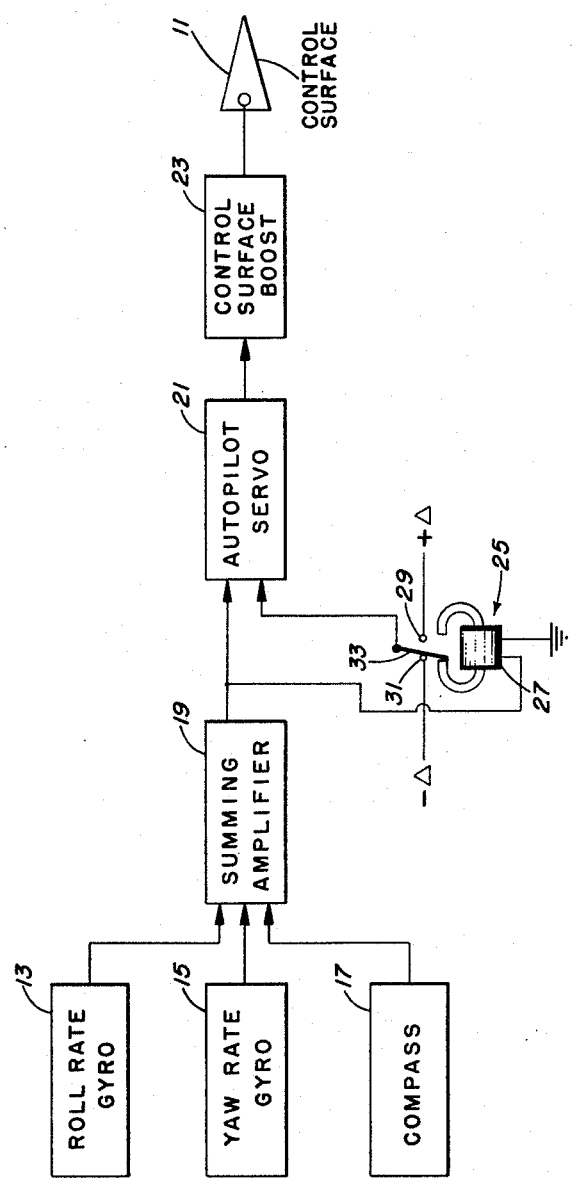
INVENTOR
ROGER R. DOUGAN
ATTORNEYS United States Patent Office 2,934,290
Patented Apr. 26, 1960

2,934,290

MEANS FOR CIRCUMVENTING LARGE DEAD ZONES IN CONTROL SURFACE EFFECTIVENESS

Roger R. Dougan, Baltimore, Md., assignor, by mesne assignments, to the United States of America as represented by the Secretary of the Navy Application July 5, 1956, Serial No. 596,120

2 Claims. (Cl. 244—77)

The present invention relates to a means for circumventing large dead zones in control surface effectiveness and more particularly to a means for circumventing large dead zones in the control surface effectiveness of high speed aircraft.

It has been found that the control surfaces of high speed aircraft do not begin to develop aerodynamic forces until they have been deflected through a relatively large angle. This difficulty is occasioned by the flexibility of the control surfaces and certain aerodynamic effects peculiar to high speed flight. Although this condition may be tolerated in manual flight up to relatively large dead zones, i.e., the zone of control surface deflection which produces no control effect, normal auto-pilot operation response quickly becomes totally unsatisfactory, since this dead zone may represent a large part of the total surface deflection normally required for satisfactory auto-pilot operation.

According to the invention, in order to overcome this difficulty, a system has been provided which adds to the sum of normal auto-pilot control signals an additional incremental surface position signal having a magnitude sufficient to cause a control surface deflection equal to the dead zone thereof. The sign of the added increment is determined by the sign of the summed auto-pilot signals.

Accordingly, it is an object of the present invention to provide a means for circumventing large dead zones in control surface effectiveness.

It is another object of the present invention to provide in an auto-pilot system a means for circumventing large dead zones in control surface effectiveness.

Other objects and many of the attendant advantages of the present invention will be readily appreciated as the same becomes better understood by reference to the following detailed description when considered in connection with the accompanying drawing wherein:

The figure shows, partly in schematic and partly in block diagram form, an illuustrative embodiment of the invention.

Referring now to the drawing, there is shown a control surface 11 to be actuated in accordance with command auto-pilot signals, for example, from a roll rate gyro 13, a yaw rate gyro 15, and a compass 17. The signals from roll rate gyro 13, yaw rate gyro 15, and compass 17 are summed by an amplifier 19 which may be of the magnetic type. The summed signals are applied to an auto-pilot servo system 21 which actuates control surface 11 through a control surface boost system 23.

The system thus far described comprises a portion of a normal auto-pilot system. In addition to the portions described, the auto-pilot system may further include conventional follow-up systems, compensation for auto-pilot system inertia, and other conventional auto-pilot system components. Further, while only one channel of an auto-pilot system has been shown the other channels would be similar.

The system thus far described in high speed aircraft would cause a deflection of control surface 11 insufficient to produce an effective controlling action due to the flexibility of control surface 11 and certain aerodynamic effects peculiar to high speed flight. As has been heretofore indicated, this region of control surface ineffectiveness is termed the dead zone of the control surface. For all practical purposes, the control surface dead zone may be considered to be a positive or negative value of fixed magnitude for a particular aircraft under operational conditions. It may be seen, therefore, that if a fixed positive or negative signal be added to the normal summed auto-pilot signals, an additional control surface deflection equal to the dead zone thereof may be obtained.

Referring again to the drawing, there is shown a differential relay 25 having a winding 27, a pair of fixed contacts 29 and 31 connected respectively to positive and negative voltage sources each having a fixed predetermined magnitude, and a movable contact 33 connected to the input of auto-pilot servo system 21.

By way of example, if the sign of the summed auto-pilot signals from amplifier 19 is such as to produce a deflection of control surface 11 in one direction, for example, clockwise, a voltage will be applied to winding 27 of such polarity, for example, to cause movable contact 33 to engage stationary contact 31, to apply to servo system 21 a fixed negative voltage increment in addition to the summed auto-pilot signals, to thereby cause control surface 11 to deflect in a clockwise direction an additional amount equal to the dead zone of the control surface. Conversely, if the sign of the auto-pilot signals is such as to cause counterclockwise rotation of control surface 11, a voltage will be applied to winding 27 of such polarity as to cause contact 33 to engage contact 29 to apply to servo system 21, in addition to the summed auto-pilot signals, a fixed positive increment of voltage, to thereby cause control surface 11 to deflect in a counterclockwise direction, an additional amount equal to the dead zone of the control surface. The terms "clockwise" and "counterclockwise" are used illustratively only since the invention is not restricted to use with rotatable control surfaces.

While the invention is not restricted to particular values of the fixed positive or negative increments, it has been discovered that in certain high speed aircraft an increment having a magnitude sufficient to cause a deflection of control surface 11 between one-half degree and five degrees is satisfactory.

While a differential relay has been shown, any other means of sensing the sign of the summed auto-pilot signals and adding thereto a fixed increment of the proper sign may be employed. Further, the auto-pilot signals may be summed and the fixed increments added thereto other than as specifically shown.

Obviously many other modifications and variations of the present invention are possible in the light of the above teachings. It is therefore to be understood that within the scope of the appended claims the invention may be practiced otherwise than as specifically described.

What is claimed is:

1. A means for circumventing large dead zones in control surface effectiveness comprising: condition sensing means operable to generate a control signal in response to a change in a condition, a deflectable control surface, servo system means coupled to said control surface, circuit means connecting said servo system to said condition responsive means whereby said control surface may be deflected in accordance with said control signal, differential relay means having two fixed contacts, a positive incremental voltage source connected to one contact, a negative incremental voltage source connected to the other contact, said differential relay means being coupled to said condition responsive means and responsive to operation thereof to apply a fixed positive or negative incremental control signal to said servo system of a magnitude sufficient to produce an additional deflection of said control surface equal to the dead zone thereof.

2. A means for circumventing large dead zones in control surface effectiveness comprising: a deflectable control surface; a plurality of condition sensing means each operable to generate a voltage; means to sum said voltages to provide a composite command signal; servo system means coupled to said control surface; circuit means connecting said servo system means to said summing means whereby said control surface may be deflected in accordance with said command signal; differential relay means having an operating winding connected to be energized by said composite command signal, a movable contact connected to said servo system means, a first stationary contact connected to a positive voltage source, and a second contact connected to a negative voltage source whereby a fixed positive or negative increment may be applied to said servo system to produce an additional deflection of said control surface equal to the dead zone thereof.

References Cited in the file of this patent

UNITED STATES PATENTS

| | | |
|---|---|---|
| 2,705,116 | Yates et al. | Mar. 29, 1955 |
| 2,770,429 | Schuck et al. | Nov. 13, 1956 |